US008353453B2

(12) United States Patent
Lee (10) Patent No.: US 8,353,453 B2
(45) Date of Patent: Jan. 15, 2013

(54) ELECTRONIC VOTING METHOD AND APPARATUS (75) Inventor: Soo Hyung Lee, Seoul (KR)

(73) Assignee: DVS Korea Co., Ltd, Gyeonggi-Do (KR)

( * ) Notice: Subject to any disclaimer, the term of this patent is extended or adjusted under 35 U.S.C. 154(b) by 0 days.

(21) Appl. No.: 13/003,321

(22) PCT Filed: May 7, 2010

(86) PCT No.: PCT/KR2010/002888
§ 371 (c)(1),
(2), (4) Date: Jan. 10, 2011

(87) PCT Pub. No.: WO2010/131868
PCT Pub. Date: Nov. 18, 2010

(65) Prior Publication Data
US 2011/0114724 A1 May 19, 2011

(30) Foreign Application Priority Data

May 15, 2009 (KR) .................. 10-2009-0042547
Jul. 29, 2009 (KR) .................. 10-2009-0069498

(51) Int. Cl.
G06F 17/00 (2006.01)

(52) U.S. Cl. ...................... 235/386; 235/385
(58) Field of Classification Search .......... 235/386, 235/385, 462.14, 470
See application file for complete search history.

(56) References Cited

U.S. PATENT DOCUMENTS

| 7,461,787 B2 * | 12/2008 | Chung .................. 235/386 |
| 8,061,589 B2 * | 11/2011 | Cohen et al. ............ 235/51 |
| 2004/0046021 A1 * | 3/2004 | Chung .................. 235/386 |
| 2011/0125556 A1 * | 5/2011 | Strabone ................ 705/12 |

FOREIGN PATENT DOCUMENTS

| JP | 2003-173382 | 6/2003 |
| KR | 10-0438153 | 7/2004 |
| KR | 10-0637872 | 10/2006 |
| KR | 10-0871808 | 12/2008 |

* cited by examiner

Primary Examiner — Daniel St Cyr
(74) Attorney, Agent, or Firm — Occhiuti Rohlicek & Tsao LLP (57) ABSTRACT The present disclosure relates to a method and apparatus for electronic voting performed in response to insertion of an electronic ballot by a voter into an electronic voting machine. The method includes storing candidate information in a candidate database, issuing an electronic ballot by a ballot dispenser in response to a ballot issuance request of a voter, displaying by the electronic voting machine a list of candidates from the candidate database when the electronic ballot is inserted into the electronic voting machine, and printing by a printer vote data related to a selected candidate on the electronic ballot, followed by dispensing the printed electronic ballot when the voter selects the candidate whom the voter wishes to vote from among the list of candidates. The electronic ballot is printed with a barcode corresponding to vote information containing at least one of data for authentication, precinct ID and polling place ID.

15 Claims, 8 Drawing Sheets

Mayor of Seoul

| symbol | Party name | Candidate name | Vote |
|---|---|---|---|
| 1 | | | ∨ |
| 2 | | | |
| | | | |

Ward head of Jongno

| symbol | Party name | Candidate name | Vote |
|---|---|---|---|
| 1 | | | |
| 2 | | | ∨ |
| | | | | councilman

| symbol | Party name | Candidate name | Vote |
|---|---|---|---|
| 1 | | | |
| 2 | | | |
| | | | |

Fig. 9

It is regarded as being selected when both operations A and B are all performed

ELECTRONIC VOTING METHOD AND APPARATUS

CROSS-REFERENCE TO RELATED APPLICATIONS

This application is the National Stage of International Application No. PCT/KR2010/002888, filed on May 7, 2010, which claims the priority of Korean Application No. 10-2009-0042547, filed on May 15, 2009, Korean Application No. 10-2009-0069498, filed on Jul. 29, 2009, the contents of which are incorporated herein by reference in their entirety.

TECHNICAL FIELD

The present disclosure relates to a method and apparatus for electronic voting, in which a conventional voting method of inserting a ballot into a ballot box is added to an electronic voting method.

BACKGROUND ART

Electronic voting and ballot-counting techniques have recently been introduced. Electronic voting and ballot-counting techniques are not inherently difficult to perform, although problems relating to fair election, voter convenience, efficiency, system error, external intrusion, etc. need to be addressed.

For example, the U.S. presidential elections employ a touch screen-based direct recording electronic voting machine (DRE), a DRE with a voter-verified paper trail, a precinct counter optical scan, etc. In a general voting procedure, a voter goes to a polling place and obtains a smart card (granting voting rights) as a voucher for participation in voting. This smart card is used in voting and votes are stored in a memory of a voting machine. However, these techniques have the following disadvantages.

Software attack—Software embedded attacks may cause an error in a voting system without difficulty, and all types of electronic voting machines are vulnerable to this attack. In particular, for a DRE generating no paper ballot, parallel testing may be conducive to tracking not only software-based attacks but also any software bug not discovered during inspection or other tests.

Wireless attack—Wireless components of a voting machine are vulnerable to a wide range of attacks.

DRE generating no paper ballot—DREs having no voter-verified paper trail (VVPT) do not have any way of detecting software-based attacks. This is because an automatic routine audit of comparing a paper record to an electronic record after an election is impossible.

Ballot trail—The VVPT is considerably suspect in itself with regard to security. Paper records are reliable only when the automatic routine audit is performed. Also, a series of well-designed filing and physical security procedures has been established for paper ballots.

DISCLOSURE

Technical Problem

One aspect of the present disclosure is to provide a method and apparatus for electronic voting which adds a conventional paper voting method to the electronic voting apparatus through program-controlled marking, optical scanning, and direct-transfer recording.

Another aspect of the present disclosure is to provide a method and apparatus for electronic voting which is useful in practice by adding a conventional paper voting method to the electronic voting apparatus instead of a fully-automated electronic voting machine.

Technical Solution

In accordance with the present disclosure, a voter obtains a blank sheet of paper, which has a recognition mark such as a barcode attached thereto, at a polling place. When the voter inserts the blank sheet of paper into a voting machine to vote for a candidate, content of the selection is printed on the blank sheet of paper, which is in turn dispensed from the voting machine as a ballot. Then, the voter simply needs to place this ballot in a ballot box as in a conventional voting method. The content printed on the ballot is stored in a system. When voting is finished, the ballots collected in the ballot box are counted.

In accordance with one aspect of the present disclosure, a method for electronic voting is performed in response to insertion of an electronic ballot by a voter into an electronic voting machine. The method includes: storing candidate information in a candidate database; displaying, by the electronic voting machine, a list of candidates from the candidate database when the electronic ballot is inserted into the electronic voting machine; and printing, by a printer, vote data related to a selected candidate on the electronic ballot, followed by dispensing the printed electronic ballot, when the voter selects the candidate whom the voter wishes to vote from among the list of candidates.

The method may further include determining, by security authenticator, whether the electronic ballot is an authentic ballot by performing authentication based on security information included in the electronic ballot, before displaying the list of candidates after the electronic ballot is inserted into the electronic voting machine. The method may further include storing a selected candidate as vote data in a vote database separately from printing the selected candidate on the electronic ballot when the voter select the candidate whom the voter wishes to vote from among the list of candidates. The method may further include printing an anti-forgery mark on the electronic ballot when printing the vote data on the electronic ballot.

The electronic ballot may be issued from the electronic voting machine after determining whether a voter requesting ballot issuance is on a list of registered voters.

The method may further include issuing the electronic ballot to the voter in response to the ballot issuance request of the voter. The issuance of the electronic ballot may include issuing the electronic ballot printed with a barcode corresponding to vote information containing at least one of data for authentication, precinct identification (ID) and polling place ID.

If the electronic ballot includes a radio-frequency identification (RFID) tag and an antenna, the issuance of the electronic ballot may include recording log information generated in the course of the electronic ballot issuance in the RFID tag, and printing out a barcode on the electronic ballot upon which the log information has been recorded. The log information may include the precinct ID, the polling place ID, and ballot paper encryption information.

The issuance of the electronic ballot may further include determining whether the voter is on a list of registered voters, and issuing as electronic ballot if the voter is on the list of registered voters.

The method may further include issuing a traditional general ballot to the voter through the ballot dispenser in response to the ballot issuance request of the voter.

The electronic ballot may include information about a precinct to in which a voter is registered and may be formed of a thermal recording paper allowing thermal recording thereon. Further, the electronic ballot may include an RFID tag and an antenna, wherein the RFID tag has precinct identification (ID), polling place ID, and ballot paper encryption information recorded thereon as the log information generated in the course of the electronic ballot issuance. The electronic ballot may further include security key information. The electronic ballot may further include an anti-forgery mark.

In accordance with another aspect of the present disclosure, an apparatus for electronic voting includes an electronic voting machine allowing electronic voting to be performed in response to insertion of an electronic ballot by a voter into the electronic voting machine. The electronic voting machine may include a candidate database storing candidate information; a candidate display displaying candidate information stored in a candidate database upon receiving the electronic ballot; a candidate selector allowing a voter to select a candidate whom the voter wishes to vote from among candidates displayed on the candidate display; and a printer printing vote data as a voting result on the electronic ballot and dispensing the printed electronic ballot. Here, the vote data contains information related to the selected candidate.

The electronic ballot may include information about a precinct of a voter and a security key, and the electronic voting machine may further include an image scanner which scans the electronic ballot and reads the information related to the precinct and the security key. The apparatus may further include a security authenticator which determines whether the electronic ballot is an authentic ballot by performing authentication based on the security key read by the image scanner.

The candidate display and the candidate selector may be realized by a single touch screen. In particular, the touch screen may be a touch panel in which touching the surface of the touch panel results in a measurable change in capacitance. Here, the candidate selector may include a stylus for pressing the touch panel, and a switch turned on when a tip of the stylus is pressed. If the touch panel is pressed by the stylus, the vote data may be processed only when variation in capacitance of the touch panel and turning-on the switch by the tip of the stylus are all performed.

The apparatus may further include a vote database which stores the vote data containing information about a candidate selected through the candidate selector.

The apparatus includes a ballot dispenser issuing the electronic ballot to the voter.

The ballot dispenser includes an issuance controller controlling the issuance of the electronic ballot to the voter in response to a voter ballot issuance request; and a printer printing the electronic ballot under control of the issuance controller.

The issuance controller may determine whether the voter is on a list of registered voters and allows the electronic ballot to be issued if the voter is on the list of registered voters.

The issuance controller may control the printer to print a bar code for authentication when issuing the electronic ballot.

If the electronic ballot includes an RFID tag and an antenna, the ballot dispenser may include an RFID recorder which records log information resulting from issuance of the electronic ballot in the RFID tag, and the issuance controller may control recording of the log information in the RFID tag.

The log information may include precinct identification (ID), polling place ID, and ballot paper encryption information.

The ballot dispenser may issue a traditional general ballot to the voter in response to the ballot issuance request of the voter.

Advantageous Effects

In accordance with an exemplary embodiment of the present disclosure, modern electronic voting is used in conjunction with conventional paper voting, thereby providing a fundamental safeguard to electronic voting system hacking. Further, a ballot is issued as in conventional voting and a selected candidate is printed on the ballot, so that a voter can easily ascertain a voting result, thereby increasing voting reliability. Furthermore, it is possible to prevent the ballot from being removed and copied without permission.

In accordance with another embodiment of the present disclosure, a voter may vote for plural candidates on a single ballot during a simultaneous election, so that the time for counting the ballots can be minimized regardless of the number of positions open for election.

DESCRIPTION OF DRAWINGS

The above and other features and advantages of the present disclosure will be more clearly understood from the following detailed description taken in conjunction with the accompanying drawings, in which.

BEST MODE

Electronic Voting Method

Figure 1:
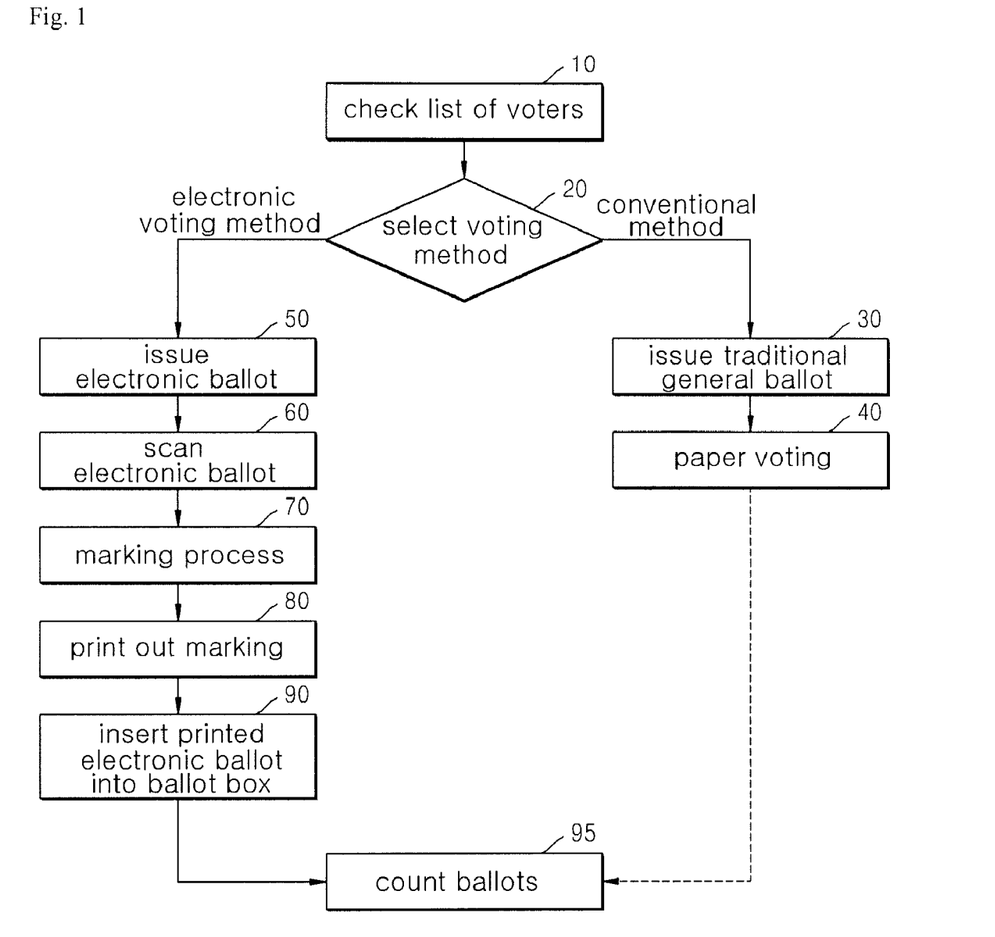
FIG. 1 is a flowchart of a voting procedure including an electronic voting method according to one exemplary embodiment of the present disclosure.

FIG. 1 is a flowchart of a voting procedure including an electronic voting method according to one exemplary embodiment of the present disclosure.

When a voter arrives at a polling place and requests a ballot, a ballot dispenser determines whether the voter is on a list of registered voters (or has right to vote) (10). If the voter is on the list of registered voters, the ballot is printed out since he/she has the right to vote. Here, the voter is allowed to select one of electronic voting and conventional paper voting (20).

If the conventional paper voting is selected, a traditional general ballot is printed and dispensed to the voter, or a general preprinted ballot (i.e., a ballot printed with all candidates and having blanks for selection) is dispensed to the voter (30). In this case, voting and ballot-counting are carried out based on the traditional paper voting method (40, 95).

On the other hand, an electronic ballot according to an exemplary embodiment of the present disclosure is issued to a voter who wants to use the electronic voting method (50). If there is a ballot issuance request from a voter, the electronic ballot is issued through a user interface for issuing the electronic ballot. When the electronic ballot is issued, the electronic ballot may be printed with a barcode containing specific information, e.g., authentication data, precinct ID, and polling place ID, and then issued to the voter. Particularly, when the electronic ballot 52 further includes an RFID tag and an antenna described below, log information (e.g., the precinct ID, the polling place ID, ballot paper encryption information, etc.) is recorded in the barcode upon issuance of the electronic ballot 52, and the electronic ballot having the log information recorded thereon is printed out with the barcode.

Next, the voter inserts the electronic ballot into an electronic voting machine according to one exemplary embodiment of the present disclosure.

In the case where the electronic ballot is formed of a thermal recording paper, the electronic ballot is printed with an anti-forgery mark to authenticate the electronic ballot when the electronic ballot is inserted into the electronic voting machine. This mark is read by a scanner, and it is thus determined whether the electronic ballot is formed of the thermal recording paper. If the electronic ballot is not the thermal recording paper but general printer paper, the mark is not printed, thereby indicating forgery.

Then, the scanner reads the barcode of the inserted electronic ballot (60).

The electronic voting machine performs an authentication procedure to determine whether the electronic ballot is an authentic ballot, and displays a list of candidates corresponding to a relevant precinct through a touch screen based on the precinct ID of the ballot if authentication is successful. When a voter selects a specific candidate to vote for through the touch screen, the electronic voting machine performs a marking process (70). Then, the selected candidate is printed out on the electronic ballot (80).

The selected candidate is stored as electronic voting data in a predetermined storage. A voter inserts the printed ballot into a traditional general ballot box (90). Ballot-counting is performed by manually counting the ballots in the ballot box or by an automated system (95).

As such, in the electronic voting apparatus according to the embodiment, a voter votes for a selected candidate, and the ballot is inserted into the ballot box after being printed with the selected candidate. Accordingly, as opposed to the conventional electronic voting method wherein voting is recorded as data in the voting machine and processed as a voting result from the recoded data, the electronic voting apparatus according to the embodiment has no problem such as data hacking of the voting machine and erroneous voting data due to malfunction of the machine. Further, since the ballot is filed after ballot-counting, reliability of a vote audit may be guaranteed as in the conventional method and repulsion against electronic voting is minimized.

Ballot Paper

Figure 2:
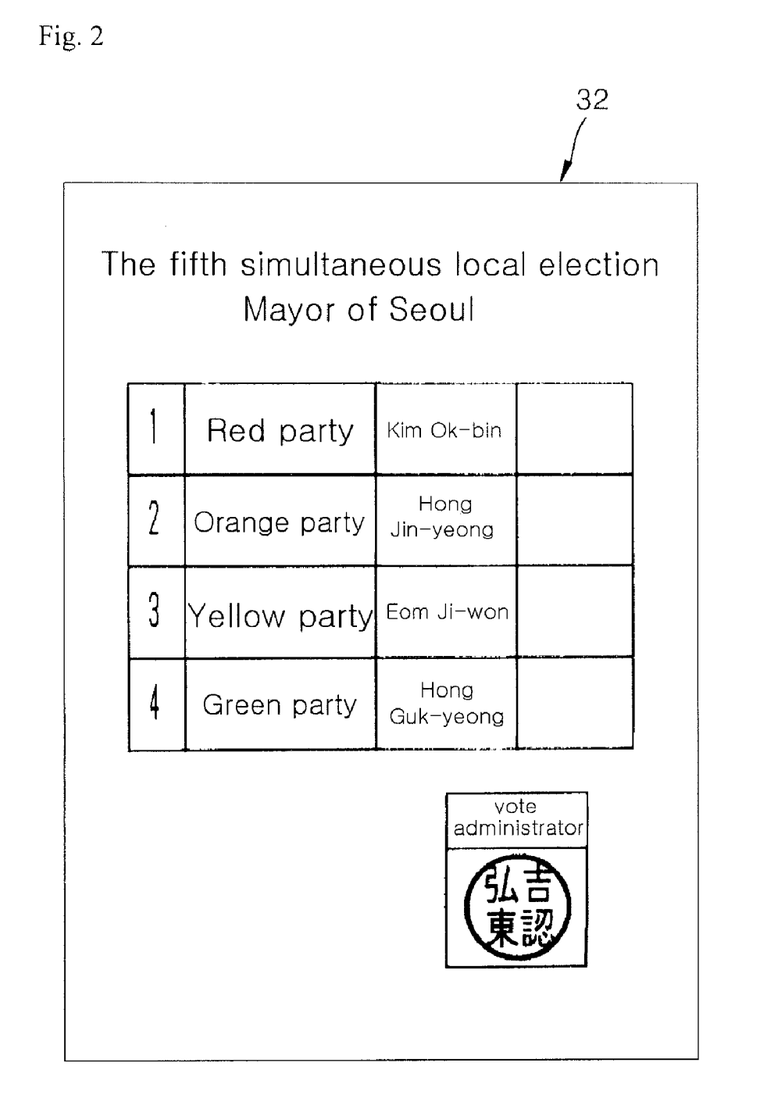
FIG. 2 shows an example of a ballot used in a conventional method.

FIG. 2 shows an example of a dispensed ballot 32 when a conventional voting method is selected. This ballot is a traditional general ballot for a person who does not wish to use electronic voting or a person who has difficulty in using electronic voting. This ballot is not different from a conventional ballot and does not pertain to an idea of the present disclosure, and thus repetitive descriptions thereof will be omitted herein.

Figure 3:
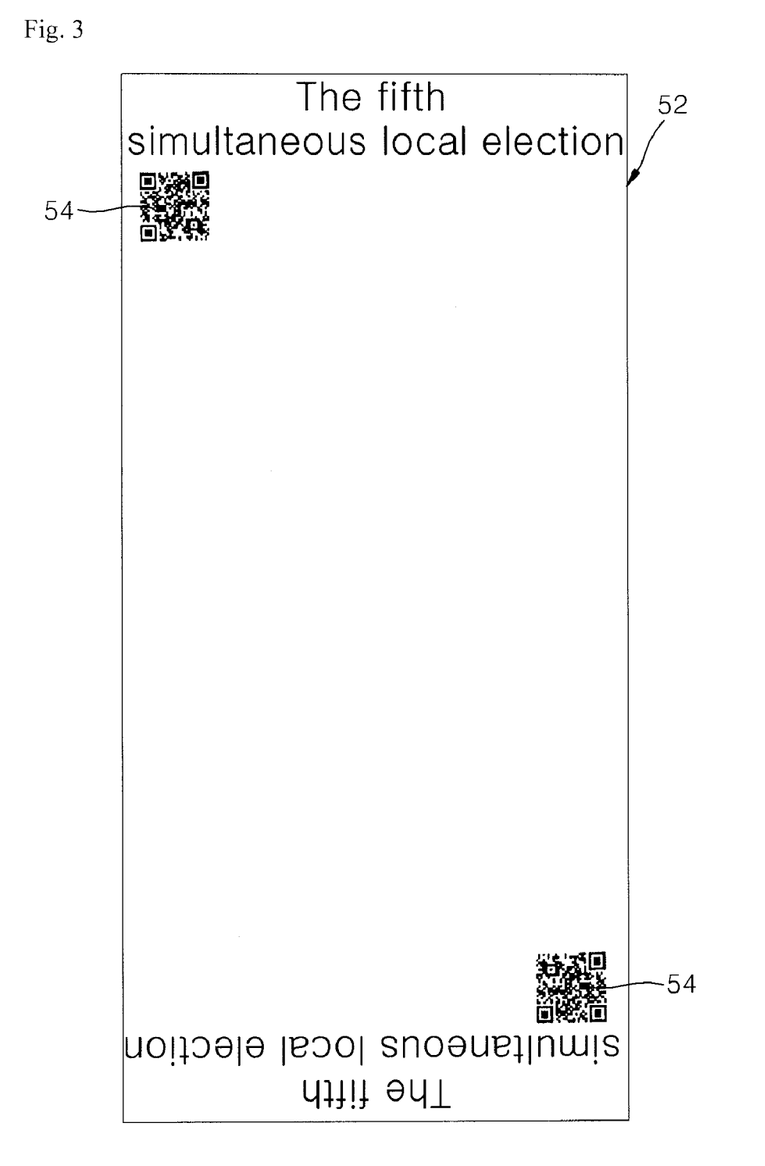
FIG. 3 shows an example of a ballot used in the method according to the embodiment of the present disclosure.

FIG. 3 shows an example of a blank electronic ballot 52 used in the method according to the embodiment. This ballot is formed of a thermal recording paper for thermal printing, but is not limited thereto.

Figure 4:
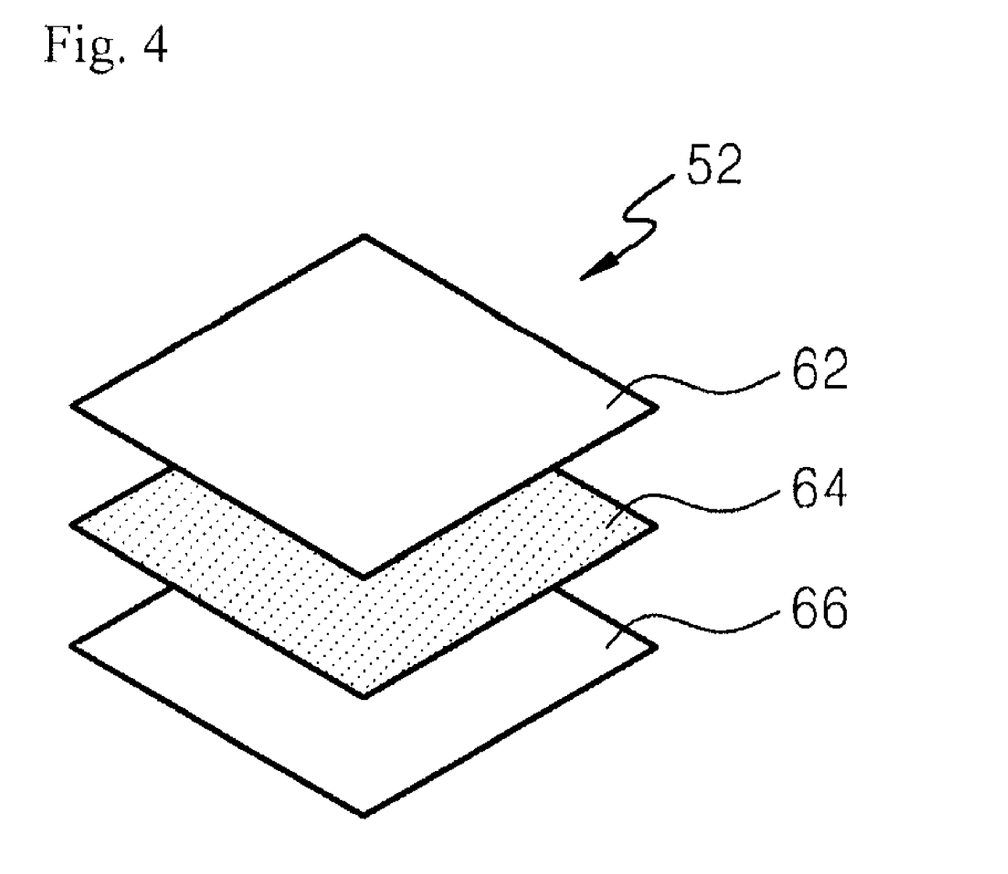
FIG. 4 shows a material of an electronic ballot according to one exemplary embodiment of the present disclosure.

In particular, the electronic ballot 52 may further include an RFID tag and an antenna. FIG. 4 shows an electronic ballot according to an exemplary embodiment, in which a sheet of a thermal recording paper 62 is stacked on a front surface of the ballot, the RFID tag and the antenna 64 are embedded under the thermal recording paper 62, and a finishing paper 66 is provided as a rear surface of the ballot. Such an electronic ballot 52 may be provided in the form of a sheet of paper or a roll. The RFID tag 64 serves to store wireless information for a local area. The antenna 64 serves to transmit and receive information of the RFID tag 64. When an electronic ballot having the RFID tag and antenna 64 embedded therein is issued to a voter who wants to use the electronic voting method, log information (e.g., the precinct ID, the polling place ID, the ballot paper encryption information, etc.) generated in the course of the electronic ballot issuance is recorded on the RFID tag 64 by an RFID recorder.

Barcode information 54 is printed on the electronic ballot 52. The barcode information contains a voter's precinct information and a security key. For example, the barcode information may contain information about precincts for voters pertaining to other precincts or absentee ballots. Also, the barcode information may include the security key for verifying the voter's identity, authenticating the ballot, etc. Because voters have different precinct information, security keys, etc., the blank electronic ballot 52 is individually printed out and issued on a per voter basis using the electronic voting method according to the embodiment of the present disclosure.

Figure 5:
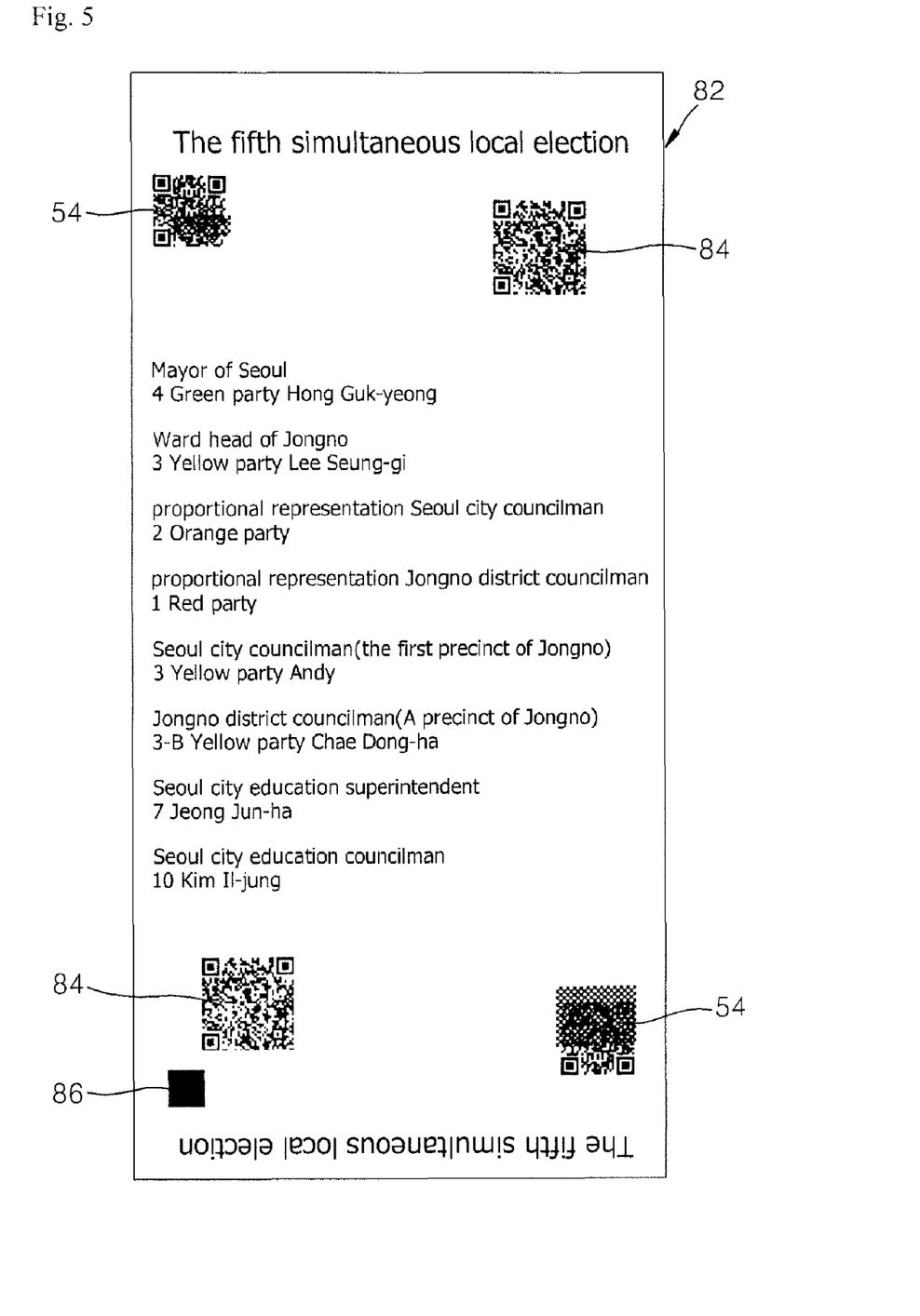
FIG. 5 shows an example of a ballot printed with a voting result.

FIG. 5 shows an example of a ballot 82 printed with a voting result of a voter voting for selected candidates through the electronic voting apparatus according to the embodiment, in which candidates selected by the voter are printed on the paper shown in FIG. 3. At this time, a new barcode 84 not shown in FIG. 3 may be additionally printed thereon. For example, the new barcode 84 may include a list of candidates selected by a voter. An anti-forgery mark 86 not shown in FIG. 3 is also printed thereon. The anti-forgery mark 86 is printed in a blank state of the electronic ballot 52. The ballot having no anti-forgery mark 86 indicates a forgery.

Figure 6:
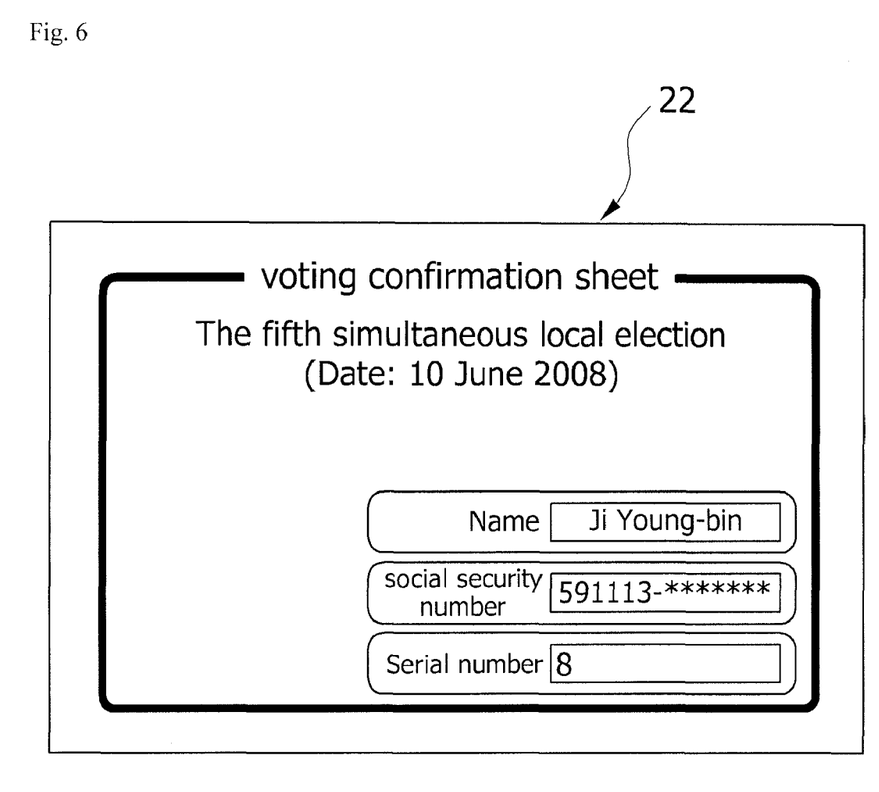
FIG. 6 shows an example of a voting confirmation sheet applicable to the present disclosure.

FIG. 6 shows an example of an optional voting confirmation sheet 22. The voting confirmation sheet 22 is provided to confirm that a certain voter votes and is printed with individual data of the voter.

Electronic Voting Apparatus

Figure 7:
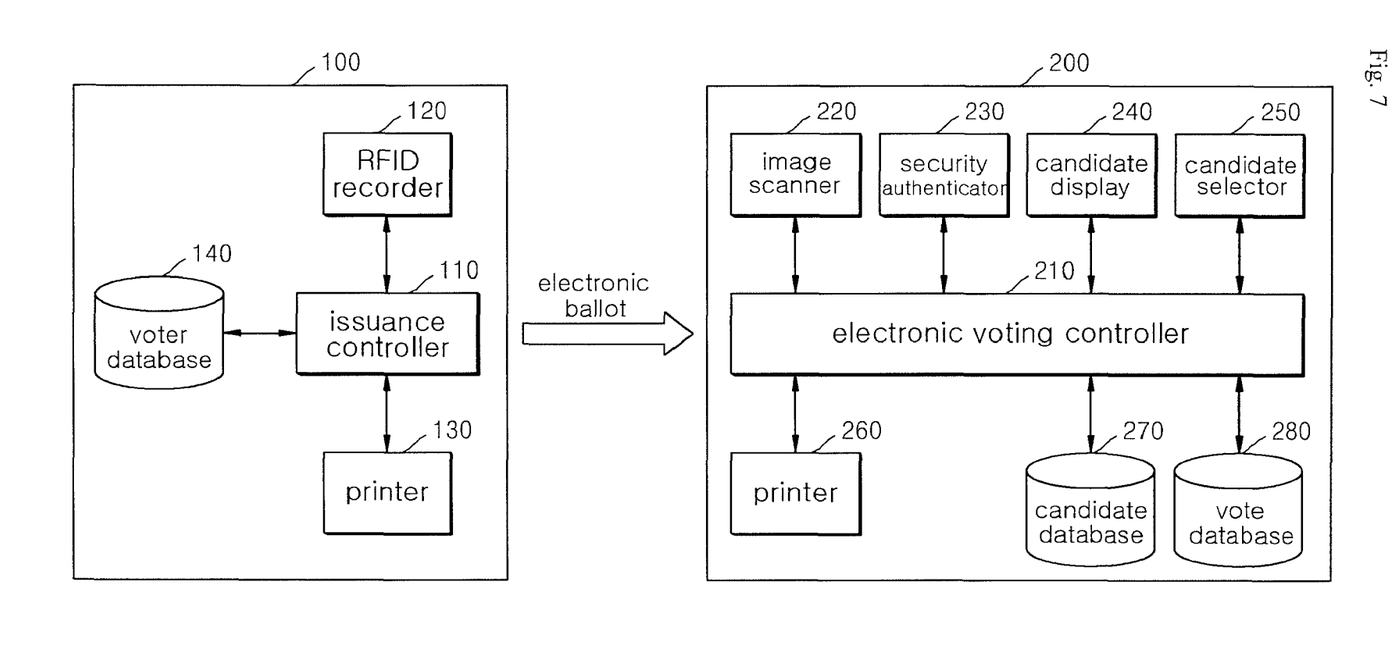
FIG. 7 is a block diagram of an electronic voting apparatus according to one exemplary embodiment of the present disclosure.

FIG. 7 is a block diagram of an electronic voting apparatus according to an exemplary embodiment of the present disclosure, which includes a ballot dispenser 100 and an electronic voting machine 200.

The ballot dispenser 100 issues an electronic ballot in response to a ballot issuance request of a voter. To this end, the ballot dispenser 100 includes an issuance controller 110, an RFID recorder 120, and a printer 130.

The issuance controller 110 controls issuance of an electronic ballot in response to a ballot issuance request of a voter. The issuance controller 110 controls a user interface (not shown) to be displayed for receiving the ballot issuance request. If a voter requests an electronic ballot through the user interface, the issuance controller 110 determines whether the voter is registered on a list of voters in a voter database 140. If the voter is registered on the list of voters in the voter database 140, the issuance controller 110 controls the printer 130 to dispense the electronic ballot.

The issuance controller 110 controls the printer 130 to print out a barcode or similar information on the electronic ballot for authentication when dispensing the ballot. Thus, the printer 130 prints out the barcode on the electronic ballot 52. The barcode information 54 printed on the electronic ballot 52 contains a voter's precinct information and a security key. Further, the barcode information may contain information about precincts for voters pertaining to other precincts or absentee ballots. The barcode information may include the security key for verifying the voter's identity, authenticating the ballot, etc.

As shown in FIG. 4, if the electronic ballot 52 is a sheet of paper having the RFID tag and the antenna thereon, the issuance controller 110 sends a control signal to the RFID recorder 120 in response to the issuance of the electronic ballot 52 so that log information (e.g., the precinct ID, the polling place ID, the ballot paper encryption information, etc.) generated in the course of the electronic ballot issuance 52 can be recorded in the RFID tag 64.

Under control of the issuance controller 110, the RFID recorder 120 records the log information, such as a precinct ID, polling place ID, ballot paper encryption information, in the RFID tag 64.

The issuance controller 110 controls the printer 130 to print the electronic ballot 52 where the log information is recorded in the RFID tag 64. Consequently, the printer 130 prints out the electronic ballot 52 where the log information is recorded in the RFID tag 64.

The issuance controller 110 controls the printer 130 to print a general ballot for a voter requesting a traditional general ballot. In this case, the printer 130 prints out the general ballot.

The electronic voting machine 200 prints out a voting result on the electronic ballot with regard to selected candidates. To this end, the electronic ballot 200 includes an electronic voting controller 210, an image scanner 220, a security authenticator 230, a candidate display 240, a candidate selector 250, a printer 260, a candidate database 270, and a vote database 280.

The electronic voting controller 210 controls theses elements to print out a voting result of a candidate selected by a voter on an electronic ballot.

In the case that the electronic ballot is formed of a thermal recording paper, the electronic voting controller 210 controls the printer 260 to print the anti-forgery mark 86 for verifying whether the electronic ballot is forged when the electronic ballot is inserted into the electronic voting machine 200. If the electronic ballot is not the thermal recording paper but general printer paper, the anti-forgery mark is not printed on the paper.

The image scanner 220 reads the printed anti-forgery mark. That the image scanner 220 reads the mark means that the electronic ballot is a normal thermal recording paper.

Further, the image scanner 220 scans the inserted electronic ballot 52 and acquires precinct information and authentication information from the barcode 54, thereby allowing the electronic voting controller 210 to process the precinct information and authentication.

FIG. 7 shows that the security authenticator 230 is provided as a separate element and receives the authentication information scanned by the image scanner 220 to process authentication, but not limited thereto. Alternatively, authentication may be performed as a function of the electronic voting controller 210.

The candidate display 240 displays candidate information stored in the candidate database 270 and allows a voter to vote for a selected candidate.

The candidate selector 250 allows a voter to select a candidate displayed on the candidate display 240.

The candidate display 240 and the candidate selector 250 may be realized by a single touch screen. A touch screen technique for displaying information and allowing a voter to select a candidate using a touch panel is apparent to a person having ordinary knowledge in the art. For example, the touch screen may employ a well-known writing-board type touch panel.

Information about the candidate selected through the candidate selector 250 and other voting-related information (hereinafter, "vote data") are encoded and stored as a file, or stored in the vote database 280.

Figure 8:
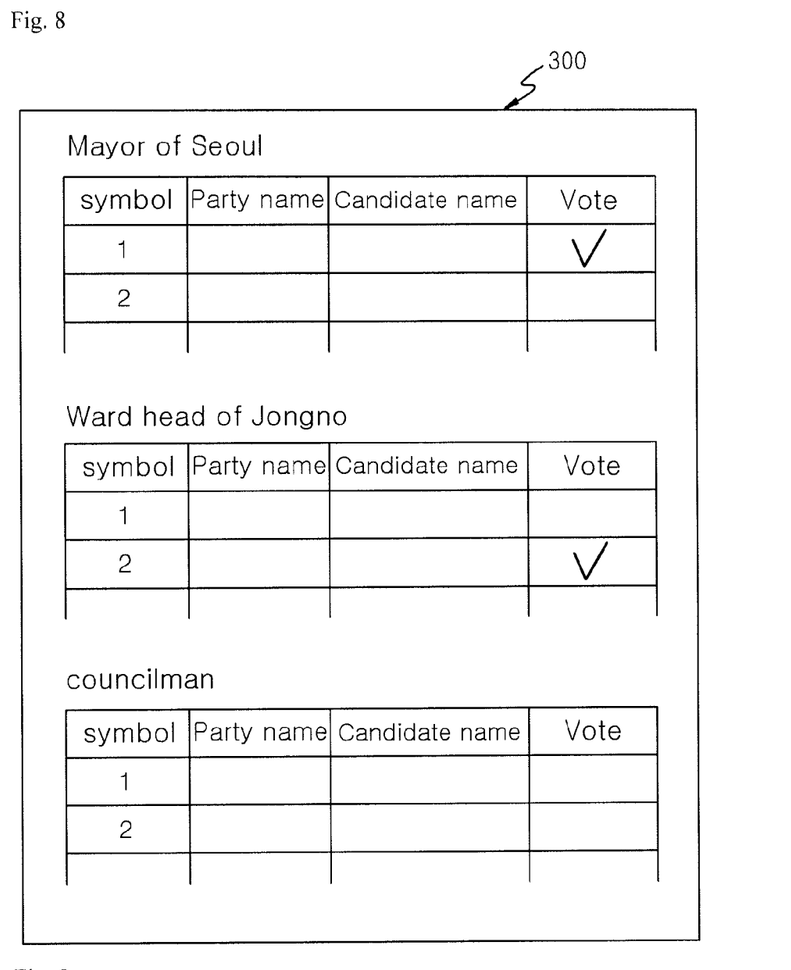
FIG. 8 shows an example of a user interface when a candidate display and a candidate selector are realized by a touch screen.

FIG. 8 shows an example of a user interface 300 when the candidate display 240 and the candidate selector 250 are realized by a single touch screen. The user interface 300 shows a list of candidates and blanks for selection of respective candidates. If the blank is touched with a finger or stylus, selection of the respective candidates is achieved. Most touch screen panels employ a pressure sensitive resistor (PSR). Thus, when a panel surface is pressed, resistance around a pressed part is varied to change capacitance, whereby certain coordinates are transmitted as selection data to the electronic voting controller 210 and processed thereby.

However, since all sorts of people vote, there may be voters who have a difficulty in correctly touching a desired position with a finger. For example, even if a voter wants to touch a blank for choosing a certain candidate with a finger, other parts than the finger may first touch a blank for other candidates. Accordingly, an error may occur in choosing the candidate.

Figure 9:
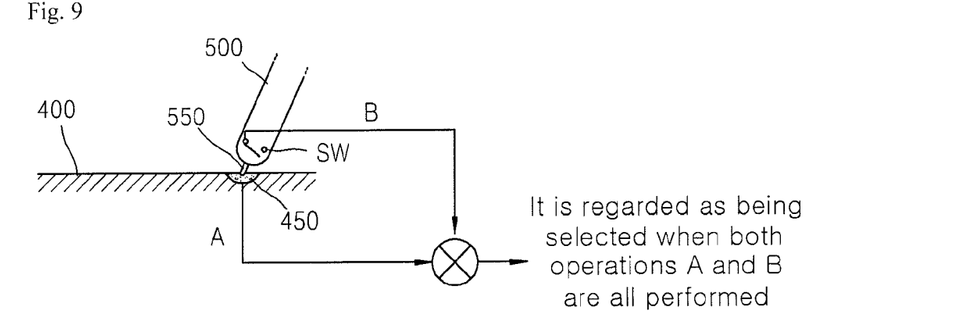
FIG. 9 is a view for explaining an exemplary embodiment of realizing a candidate selector of FIG. 7.

To minimize such an error in choosing the candidate, technology as shown in FIG. 9 is applied to the candidate selector 250. Basically, a stylus 500 is used for selection. In addition to a function of simply pressing a certain part 450 of a touch panel 400, the stylus 500 is provided at a distal end thereof with a tip 550 to press a switch SW. If the touch panel 400 is pressed with the stylus 500, a central processing unit 100 processes vote data only when operation A where the touch panel 400 itself varies in capacitance and operation B where the switch SW is turned on by the tip 550 at the distal end of the stylus 500 are all performed.

Referring again to FIG. 7, the printer 260 prints the vote data processed by the electronic voting controller 210 as a voting result on the blank ballot 52, and outputs the ballot 82 as shown in FIG. 5. As mentioned above, the printer 260 prints the anti-forgery mark 86 on the ballot 52 as well as the voting result. Also, the printer 260 prints a new barcode 84.

Then, a voter inserts the printout ballot 82 into the ballot box and leaves the polling place. After the vote, the ballot box is opened and the ballots are counted as in a conventional method. At this time, an RFID reader (not shown) may be installed at an entrance into a polling place so as to prevent a voter from taking the ballot 82 out of the polling place. If a voter may take out the ballot 82 without permission, the RFID reader receives and reads log information, recorded in the RFID tag 64 embedded in the ballot 82, through the antenna 64, thereby outputting a warning sound.

In the method and apparatus according to the embodiments, vote data containing information about candidates is not stored as purely electronic data in the apparatus, and voting results of voters are filed in the form of printed ballots, as in the conventional voting method, thereby solving problems of hacking the electronic apparatus, errors in selection, etc. Further, disputes and accusation of fraud are no more likely given the electronic voting method than in traditional voting methods. Furthermore, it is possible to prevent the ballot from being removed and copied without permission.

Although some embodiments have been shown and described with reference to accompanying drawings, it will be appreciated by those skilled in the art that modification and changes may be made in these exemplary embodiments without departing from the spirit and scope of the present disclosure, which are defined only by the appended claims and equivalents thereof.

The invention claimed is:

1. A method for electronic voting performed in response to insertion of an electronic ballot by a voter into an electronic voting machine, the method comprising:
   issuing an electronic ballot by a ballot dispenser in response to a ballot issuance request of a voter, the electronic ballot being printed with a barcode corresponding to vote information containing at least one of data for authentication, precinct identification (ID) and polling place ID;
   printing, by the electronic voting machine, an anti-forgery mark on the electronic ballot when the electronic ballot is inserted into the electronic voting machine;
   scanning, by the electronic voting machine, the anti-forgery mark printed on the electronic ballot and verifying whether the electronic ballot is forged;
   displaying, by the electronic voting machine, a list of candidates from the candidate database; and
   printing, by the electronic voting machine, vote data related to a selected candidate on the electronic ballot, followed by dispensing the printed electronic ballot, when the voter selects the candidate whom the voter wishes to vote from among the list of candidates,
   wherein if the electronic ballot comprises a radio-frequency identification (RFID) tag and an antenna, the issuance of the electronic ballot comprises recording log information generated in the course of the electronic ballot issuance in the RFID tag, and printing out a barcode on the electronic ballot recorded with the log information by the ballot dispenser.

2. The method of claim 1, further comprising: determining, by the electronic voting machine, whether the electronic ballot is an authentic ballot by performing authentication based on the data for authentication included in the electronic ballot, before displaying the list of candidates.

3. The method of claim 1, further comprising: storing the selected candidate as vote data in a vote database separately from printing the selected candidate on the electronic ballot when the voter select the candidate from among the list of candidates.

4. The method of claim 1, wherein the log information comprises the precinct ID, the polling place ID, and ballot paper encryption information.

5. The method of claim 1, wherein the issuance of the electronic ballot further comprises determining by the ballot dispenser whether the voter requesting the issuance of the electronic ballot is on a list of voters stored in a voter database, and issuing the electronic ballot if the voter is registered on the list of voters.

6. The method of claim 1, further comprising: issuing a traditional general ballot to the voter through the ballot dispenser in response to the ballot issuance request of the voter.

7. The method of claim 1, wherein the electronic ballot comprises a thermal recording paper.

8. An apparatus for electronic voting including an electronic voting machine allowing electronic voting to be performed in response to insertion of an electronic ballot by a voter into the electronic voting machine, the apparatus comprising:
   a ballot dispenser printing a barcode corresponding to vote information containing at least one of data for authentication, precinct ID and polling place ID on the electronic ballot, and issuing the electronic ballot to a voter in response to a ballot issuance request of the voter; and
   the electronic voting machine printing out a voting result of a selected candidate on the electronic ballot,
   the ballot dispenser comprising:
   an issuance controller controlling the issuance of the electronic ballot to the voter; and
   a printer printing the barcode corresponding to the vote information on the electronic ballot under control of the issuance controller,
   the electronic voting machine comprising:
   a candidate database storing candidate information;
   a candidate display displaying the candidate information stored in the candidate database upon receiving the electronic ballot;
   a candidate selector allowing the voter to select a candidate whom the voter wishes to vote from among candidates displayed on the candidate display;
   a printer printing an anti-forgery mark on the electronic ballot and printing vote data as a voting result on the electronic ballot and dispensing the printed electronic ballot, the vote data containing information related to the selected candidate;
   an image scanner scanning the anti-forgery mark on the electronic ballot; and
   an electronic voting controller verifying whether the electronic ballot is forged based on the anti-forgery mark and controlling the voting result for the selected candidate to be printed on the electronic ballot,
   wherein if the electronic ballot comprises an RFID tag and an antenna, the ballot dispenser comprises an RFID recorder which records log information generated in the course of the electronic ballot issuance in the RFID tag, and the issuance controller controls recording of the log information in the RFID tag; and
   further comprising a touch panel in which touching the surface of the touch panel results in a measurable change in capacitance, the candidate selector comprises a stylus for pressing the touch panel, and a switch turned on when a distal end of the stylus is pressed, and if the touch panel is pressed by the stylus, vote data is processed only when variation in capacitance of the touch panel and turning-on the switch by the tip of the stylus are all performed.

9. The apparatus of claim 8, wherein the electronic ballot comprises information about a precinct of a voter and a security key, and
   wherein the image scanner scans the electronic ballot and reads the information related to the precinct and the security key.

10. The apparatus of claim 9, further comprising: a security authenticator which determines whether the electronic ballot is an authentic ballot by performing authentication based on the security key read by the image scanner.

11. The apparatus of claim 8, wherein the candidate display and the candidate selector are realized by a single touch screen.

12. The apparatus of claim 8, further comprising: a vote database which stores the vote data containing information about a candidate selected through the candidate selector.

13. The apparatus of claim 8, further comprising: a voter database storing data about a list of voters,
 wherein the issuance controller determines whether the voter is registered on the list of voters and allows issuance of the electronic ballot when the voter is registered on the list of voters.

14. The apparatus of claim 8, wherein the log information comprises precinct ID, polling place ID, and ballot paper encryption information.

15. The apparatus of claim 8, wherein the ballot dispenser issues a traditional general ballot to the voter in response to the ballot issuance request of the voter.

\* \* \* \* \*